(12) United States Patent
Polania Castro

(10) Patent No.: US 11,022,476 B2
(45) Date of Patent: Jun. 1, 2021

(54) SOUND EMISSION ANALYSIS

(71) Applicant: Honda Motor Co., Ltd., Tokyo (JP)

(72) Inventor: Boris Hernan Polania Castro, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 16/134,279

(22) Filed: Sep. 18, 2018

(65) Prior Publication Data

US 2020/0088563 A1 Mar. 19, 2020

(51) Int. Cl.
*G01F 23/296* (2006.01)
*G01F 23/00* (2006.01)
*G07C 5/00* (2006.01)
*B60W 40/105* (2012.01)

(52) U.S. Cl.
CPC ......... *G01F 23/296* (2013.01); *B60W 40/105* (2013.01); *G01F 23/0076* (2013.01); *G07C 5/008* (2013.01)

(58) Field of Classification Search
CPC ... G01F 23/296; G01F 23/0076; G07C 5/008; B60W 40/105; G01P 3/50; G01P 3/00
See application file for complete search history.

(56) References Cited

U.S. PATENT DOCUMENTS

| | | | |
|---|---|---|---|
| 6,778,894 B2 | 8/2004 | Beck et al. | |
| 6,925,879 B2 | 8/2005 | Raichle | |
| 7,647,827 B2 | 1/2010 | Pelecanos et al. | |
| 2003/0088346 A1 | 5/2003 | Calkins et al. | |
| 2007/0032968 A1* | 2/2007 | Nakamura | G01H 1/003 702/56 |
| 2011/0106440 A1* | 5/2011 | Adradi | G01C 21/12 701/532 |
| 2014/0069195 A1 | 3/2014 | Ledbetter | |
| 2017/0363581 A1 | 12/2017 | Makin et al. | |
| 2018/0003593 A1 | 1/2018 | Siegel et al. | |
| 2018/0068493 A1 | 3/2018 | Russ et al. | |
| 2020/0066256 A1* | 2/2020 | Mossoba | G05B 19/042 |

FOREIGN PATENT DOCUMENTS

DE 102006049247 A1 * 4/2008 ............... G01P 3/50

* cited by examiner

*Primary Examiner* — Manuel L Barbee
(74) *Attorney, Agent, or Firm* — Rankin, Hill & Clark LLP

(57) ABSTRACT

Systems and techniques for sound emission analysis are provided. An audio sample may be detected, including an engine audio sample associated with acoustic information of a motorcycle engine. Signal processing may be performed to isolate the engine audio sample associated with sounds from the motorcycle engine from background noise within the audio sample. The isolated engine audio sample may be analyzed for a characteristic indicative of a fuel level or a speed of the motorcycle. The fuel level or the speed may be estimated or calculated based on the engine audio sample. The isolation, the signal processing, and the estimation or calculation may occur device-side on a mobile device near the motorcycle. Alternatively, the isolation, the signal processing, and the estimation or calculation may occur server-side, and the results may be transmitted back to the mobile device.

19 Claims, 5 Drawing Sheets

SOUND EMISSION ANALYSIS

BACKGROUND

In some motorcycles, a muffler may be disposed below an engine of the motorcycle. The engine may be mounted between front and rear wheels of the motorcycle. Exhaust gas from the engine may be discharged through an exhaust pipe that extends from the engine. A silencer or muffler may be attached to the end of the exhaust pipe. Although the muffler or silencer may be used, noise may still be emitted from the engine. Additionally, motorcycles may include fuel gauges which include a sensing unit and an indicator unit. The sensor unit senses the level of fuel in a fuel tank while the indicator unit displays the amount of fuel remaining in the fuel tank.

BRIEF DESCRIPTION

According to one aspect, a system for sound emission analysis may include a sensor, a processor, and a memory. The sensor may detect an audio sample. The audio sample may include an engine audio sample associated with acoustic information of a motorcycle engine. The memory may store instructions which may be executed by the processor. The processor may perform signal processing to isolate the engine audio sample from background noise associated with the audio sample, analyzing the isolated engine audio sample for a characteristic indicative of a fuel level of the motorcycle, and estimating the fuel level for the motorcycle based on the isolated engine audio sample.

Additionally, the processor may receive, from an input portion of the system for sound emission analysis, a make or model associated with the motorcycle and estimate the fuel level for the motorcycle based on the engine audio sample and the make or model associated with the motorcycle. The system for sound emission analysis may include a transmitter and a receiver. The receiver may receive, from a remote server, a make or model associated with the motorcycle, and the memory may include instructions for the processor to perform estimating the fuel level for the motorcycle based on the engine audio sample and the make or model associated with the motorcycle. The receiver may receive sensor information from the motorcycle, and the memory may include instructions for the processor to perform estimating the fuel level for the motorcycle based on the engine audio sample and the sensor information received from the motorcycle. The receiver may receive sensor information from the motorcycle, and the memory may include instructions for the processor to perform verifying the fuel level for the motorcycle based on the sensor information received from the motorcycle. The transmitter may transmit the estimated fuel level for the motorcycle and isolated engine audio sample to a remote server. The receiver may receive a remotely calculated fuel level for the motorcycle in response to transmitting the estimated fuel level for the motorcycle and isolated engine audio sample to the remote server.

According to one aspect, a system for sound emission analysis may include a sensor, a processor, a memory, a transmitter, and a receiver. The sensor may detect an audio sample, and the audio sample may include an engine audio sample associated with acoustic information of a motorcycle engine. The memory may store instructions which may be executed by the processor. The processor may perform signal processing to isolate the engine audio sample from background noise associated with the audio sample. The transmitter may transmit the isolated engine audio sample to a remote server. The receiver may receive an estimated fuel level for the motorcycle from the remote server based on the transmitted isolated engine audio sample.

The system for sound emission analysis may include an input portion receiving a make or model associated with the motorcycle. The transmitter may transmit the make or model associated with the motorcycle to the remote server, and the receiver may receive the estimated fuel level for the motorcycle from the remote server based on the transmitted make or model associated with the motorcycle. The receiver may receive sensor information from the motorcycle, the transmitter may transmit the sensor information to the remote server, and the receiver may receive the estimated fuel level for the motorcycle from the remote server based on the transmitted sensor information. The receiver may receive sensor information from the motorcycle, and the processor may verify the estimated fuel level for the motorcycle against the received sensor information from the motorcycle. The transmitter may transmit a discrepancy between the estimated fuel level for the motorcycle and the received sensor information to the remote server. The discrepancy may be utilized by the remote server to update a sound emission database. The system for sound emission analysis may include a display displaying the estimated fuel level for the motorcycle.

According to one aspect, a system for sound emission analysis may include a sensor, a processor, and a memory. The sensor may detect an audio sample. The audio sample may include an engine audio sample associated with acoustic information of a motorcycle engine. The memory may store instructions which may be executed by the processor. The processor may perform signal processing to isolate the engine audio sample from background noise associated with the audio sample, analyzing the isolated engine audio sample for a characteristic indicative of a speed of the motorcycle, and estimating the speed of the motorcycle based on the isolated engine audio sample.

The memory may include instructions for the processor to perform receiving, from an input portion of the system for sound emission analysis, a make or model associated with the motorcycle and estimating the speed for the motorcycle based on the engine audio sample and the make or model associated with the motorcycle. The system for sound emission analysis may include a receiver receiving, from a remote server, a make or model associated with the motorcycle, and the memory may include instructions for the processor to perform estimating the speed of the motorcycle based on the engine audio sample and the make or model associated with the motorcycle.

The system for sound emission analysis may include a receiver receiving sensor information from the motorcycle, and the memory may include instructions for the processor to perform estimating the speed of the motorcycle based on the engine audio sample and the sensor information received from the motorcycle. The system for sound emission analysis may include a receiver receiving sensor information from the motorcycle, and the memory may include instructions for the processor to perform verifying the speed of the motorcycle based on the sensor information received from the motorcycle. The system for sound emission analysis may include a transmitter transmitting the estimated speed of the motorcycle and isolated engine audio sample to a remote server.

DETAILED DESCRIPTION

Figure 1:
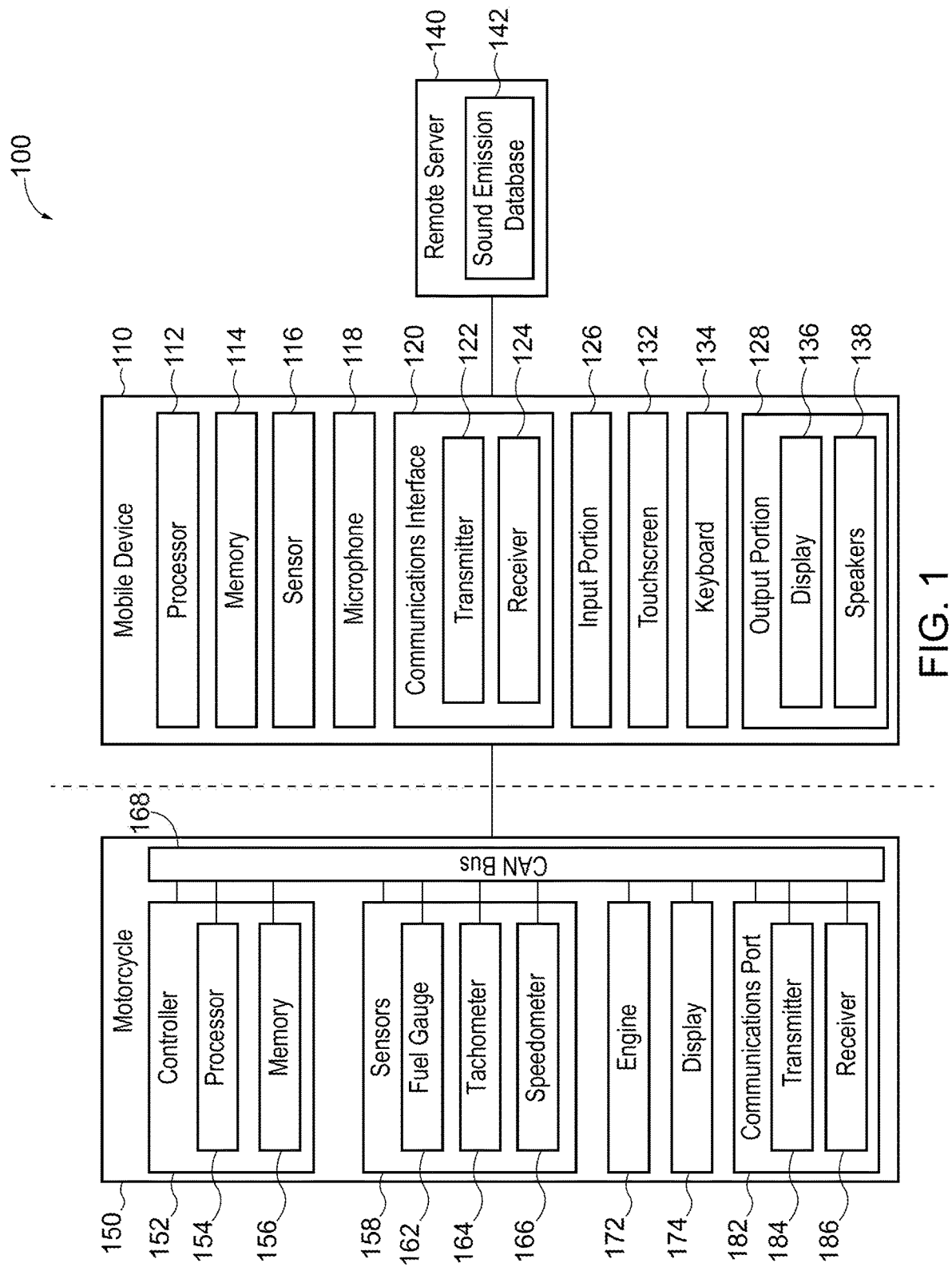
FIG. 1 is an exemplary component diagram of a system for sound emission analysis, according to one aspect.

The following terms are used throughout the disclosure, the definitions of which are provided herein to assist in understanding one or more aspects of the disclosure.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface. For example, components of the motorcycle, remote server, and mobile device of FIG. 1 may be operably connected and perform computer communication with one another (e.g., via the transmitter(s) and/or receiver(s)).

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a system 100 for sound emission analysis, according to one aspect. The system 100 for sound emission analysis may be implemented on a mobile device, on a remote server, or a combination thereof. Generally, a motorcycle includes a motorcycle engine or an engine. Historically, vehicles such as the motorcycle of FIG. 1 have included sensors or other instruments, such as a fuel gauge, a speedometer, a tachometer, etc. However, because sensors or instruments are implemented as hardware, which is a part of the vehicle, there may be an added cost associated with providing these sensors or instruments during manufacturing of the vehicle or the motorcycle. Additionally, because sensors or instruments may fail over a lifetime of the motorcycle or because sensors may be associated with inaccurate measurements, redundancies may be desired. In this regard, the system 100 for sound emission analysis of FIG. 1 may utilize engine noise from the engine of the motorcycle to calculate or estimate aspects related to or associated with the motorcycle. Examples of this may include calculating a fuel level of the motorcycle or a speed associated with the motorcycle based on detected sound samples of engine noise. Although the following examples are described with respect to engine noise, other acoustic information associated with vehicles or motorcycles may be utilized to characterize other vehicle attributes.

As previously mentioned, the system 100 for sound emission analysis may be implemented on a mobile device 110, which may be a smartphone or other portable device, for example. The mobile device 110 may include a processor 112, a memory 114, a sensor 116, such as a microphone 118, a communications interface 120 including a transmitter 122 and a receiver 124, an input portion 126, which may include a touchscreen 132 or a keyboard 134, and an output portion 128, which may be a display 136 and/or speakers 138, for example. Additionally, the system 100 for sound emission analysis may be implemented on a remote server 140. The remote server 140 may include a sound emission database 142.

The motorcycle 150 may include a controller 152 which includes a processor 154 and a memory 156, sensors 158 or instruments, such as a fuel gauge 162, a tachometer 164, or a speedometer 166, a bus, such as a controller area network (CAN) bus 168, an engine 172, a display 174, a communication port 182 including a transmitter 184 and a receiver 186.

Initial Training Phase

According to one aspect, the system 100 for sound emission analysis, as implemented on the mobile device 110, may utilize acoustics or sound samples from the engine 172 of the motorcycle 150 to determine issues, aspects, or characteristics related to the motorcycle 150, and to train the sound emission database 142 via machine learning (e.g., during a training phase). For example, the engine 172 or a muffler of the motorcycle 150 may emit noise, which may be received or detected as an audio sample including acoustic information. This acoustic information may be indicative of a fuel level of the motorcycle 150 or a velocity of the motorcycle 150. Using a microphone, such as the microphone 118 of the mobile device 110, this acoustic information may be captured as an audio sample. The audio sample may include an engine audio sample associated with sound emitted by the motorcycle engine 172, but may also include background noise. In this way, the sensor 116 or the microphone 118 of the mobile device 110 may capture audio associated with the engine 172 of the motorcycle 150.

The captured audio or audio sample may be downsized and/or processed (e.g., via the processor 112 of the mobile device 110) to remove the background noise or otherwise isolate the engine audio sample associated with the acoustic information of the motorcycle engine 172 (e.g., the acoustic information indicative of the fuel level or the velocity) from the background noise associated with the audio sample. The audio sample, the isolated engine audio sample, the acoustic information indicative of the fuel level or the velocity, and corresponding fuel level or velocity information may be transmitted (e.g., via the transmitter 122 of the mobile device 110) to the remote server 140 and used to build the sound emission database 142. In any event, the memory 114 of the mobile device 110 may store an application, a mobile app, or instructions associated therewith which when executed by the processor 112, generates an interface at the display 136 of the mobile device 110 enabling capture of the audio sample, capture of user inputs, and other actions associated with training of the sound emission database 142.

In this regard, the sensors of the motorcycle 150, at least during the training phase for the sound emission database 142, may include the fuel gauge 162, the speedometer 166, and/or the tachometer 164. The fuel gauge 162 may provide a corresponding fuel level reading or measurement while the engine 172 of the motorcycle 150 emits the noise or the audio sample, and together, this set of information may be transmitted to the remote server 140 to build the sound emission database 142. Similarly, the tachometer 164 may provide a revolutions per minute reading or measurement corresponding to engine noise being emitted while the speedometer 166 may provide a velocity reading or measurement paired with the engine noise and this information may be transmitted to the remote server 140, which builds the sound emission database 142.

According to one aspect, the motorcycle 150 may be equipped with a microphone (e.g., rather than using the microphone 118 of the mobile device 110) during the training phase to facilitate training of the sound emission database 142. In this aspect, the motorcycle 150 may capture the audio sample using its own microphone and all corresponding readings using the on-board motorcycle sensors, received by the CAN bus 168 and transmitted by the transmitter 184 of the motorcycle 150 (e.g., rather than the transmitter 122 of the mobile device 110). The transmitter of the communication port 182 may transmit this information, in a raw or processed form to the remote server 140, which may build the sound emission database 142 therefrom. However, a variety of variations may be implemented. For example, the controller 152 of the motorcycle 150 may perform the audio processing to isolate the acoustic information or the engine audio sample at the front end prior to transmitting the respective data to the remote server 140, thereby mitigating the amount of data transferred or transmitted. As another example, when the mobile device 110 is utilized to collect the audio sample (e.g., using the microphone 118 of the mobile device 110), the processor 112 of the mobile device 110 may perform the audio processing to isolate the acoustic information or the engine audio sample prior to transmitting the respective data to the remote server 140.

According to another aspect, the raw audio sample and/or the sensor data from the sensors may be transmitted directly to the remote server 140, which may perform the building of the sound emission database 142 in a back-end type fashion. In other words, the remote server 140 may receive the audio sample and perform the isolation of the engine audio sample, and correlate this isolated engine audio sample with the received sensor information (e.g., the RPM information measured by the tachometer 164, the velocity measured by the speedometer 166, the fuel level measured by the fuel gauge 162) to build the sound emission database 142. Additionally, while building the sound emission database 142, a make and/or model associated with the motorcycle 150 or vehicle may be noted or included within the sound emission database 142 due to differences in the acoustic characteristics between makes or models of vehicles. In other words, a motorcycle near an empty fuel level may be associated with different acoustic properties (e.g., frequency, acoustic wave propagation, pressure levels, etc.) than a motorcycle near a full fuel level. This may be manually noted, included in a transmission from the motorcycle 150 (e.g., automatically based on a vehicle identification number (VIN) or other vehicle identifier), or included from a transmission from the mobile device 110 (e.g., which may be manually input from the input portion 126 of the mobile device 110 or automatic, according to the mobile app or application for sound emission analysis).

According to one aspect, machine learning may be utilized by the remote server 140 to train the sound emission database 142. For example, the motorcycle 150 may be filled to different fuel levels and the acoustic information or sound samples captured and correlated. Further, the training phase may include a tuning or testing phase where the system 100 for sound emission analysis captures an audio sample of the motorcycle engine 172 associated with a known fuel level, and estimates an estimated fuel level for comparison against the known fuel level or ground truth fuel level. Based on a discrepancy, the sound emission database 142 may be adjusted or updated.

Operational Phase

According to one aspect, the system 100 for sound emission analysis may be implemented on the mobile device 110 and/or the remote server 140. According to the following example, the fuel level of the motorcycle 150 may be estimated using the sound emission database 142 from the remote server 140 based on audio collected by the microphone 118 of the mobile device 110. Audio, such as an audio sample may be captured or detected by the microphone 118 or a sensor, such as an audio sensor 116 of the mobile device 110 when the application or the mobile app for sound emission analysis is launched. In other words, when the application for sound emission analysis is launched or is active, the microphone 118 of the mobile device 110 is active and scans for engine noise or similar sound samples. As previously discussed, the audio sample may include an engine audio sample associated with acoustic information from the motorcycle engine 172. In this way, the sensor 116 or the microphone 118 of the mobile device 110 may capture audio associated with the motorcycle engine 172 of the motorcycle 150 and 'translate' this audio into engine-related or vehicle-related information (e.g., fuel level, velocity, etc.) using the sound emission database 142.

The application or mobile app for sound emission analysis may include instructions for the processor 112, 154 to perform signal processing on the audio sample to reduce noise associated with the captured audio sample or to downsize or remove background noise from the audio sample. Signal processing may be performed to isolate the engine audio sample associated with sounds from the motorcycle engine 172 from background noise within the audio sample. For example, the processor 112, 154 may perform signal processing to isolate the engine audio sample from the background noise associated with the audio sample. The engine audio sample may be a portion of the audio sample associated with the acoustic characteristics or acoustic information from the motorcycle engine 172. Further, once isolated, the isolated engine audio sample may include characteristics or attributes which are indicative of the fuel level of the motorcycle 150 or the velocity of the motorcycle 150.

Further, the processor 112 of the mobile device 110 may analyze the isolated engine audio sample for these characteristics and estimate the fuel level for the motorcycle 150 based on this isolated engine audio sample. This may be achieved by extracting an acoustic characteristic (e.g., frequency, acoustic wave propagation, pressure levels, etc.) from the isolated engine audio sample and referencing a corresponding acoustic characteristic from the sound emission database 142 of the remote server 140. Stated another way, the transmitter 122 of the mobile device 110 may transmit the extracted acoustic characteristic to the remote server 140, which may look up the corresponding acoustic characteristic using the sound emission database 142 (e.g., which may be implemented as a set of lookup tables), and receive a response from the remote server 140 with the corresponding estimated fuel level for the motorcycle 150. In other words, the remote server 140 may transmit, back to the mobile device 110, the estimated fuel level based on the transmitted acoustic characteristic. The mobile device 110 may include the display 136 for displaying the estimated fuel level for the motorcycle 150.

According to one aspect, the sound emission database 142 may be stored on the memory 114 of the mobile device 110, and no transmission of any data or information is required. According to this aspect, once the acoustic characteristic is extracted by the processor 112 of the mobile device 110, the corresponding acoustic characteristic may be looked up using the sound emission database 142 local to the mobile device 110, and the estimated fuel level may be provided directly by the mobile device 110 at the display 136 of the mobile device 110. Thus, the sound emission database 142 may be local or remote to the application for sound emission analysis, according to one or more aspects. It will be appreciated that many different variations of the system for system 100 for sound emission analysis are possible. For example, according to one aspect, the isolation, the signal processing, and the estimation or calculation may occur device-side on the processor 112 of the mobile device 110 which is near the motorcycle 150.

According to other aspects, the isolation, the signal processing, and the estimation or calculation may occur server-side, and the results may be transmitted back to the mobile device 110. For example, the sensor 116 of the mobile device 110 may detect the audio sample when the application is active or launched. The processor 112 of the mobile device 110 may perform signal processing to isolate the engine audio sample associated with the motorcycle engine 172 from background noise associated with the audio sample. The transmitter 122 of the mobile device 110 may transmit the isolated engine audio sample to the remote server 140, which may determine, calculate, or estimate the engine-related or vehicle-related information (e.g., estimated fuel level, estimated velocity, etc.) using the sound emission database 142 or based on the transmitted information (e.g., the transmitted isolated engine audio sample). In this regard, the receiver 124 may receive a remotely calculated fuel level for the motorcycle 150 in response to transmitting the estimated fuel level for the motorcycle 150 and isolated engine audio sample to the remote server 140.

As previously discussed, other variations may be possible, such as where the raw or captured audio sample is transmitted directed to the remote server 140, which may perform the signal processing to isolate the engine audio sample, rather than the mobile device 110. Therefore, the remote server 140 may determine the acoustic characteristic associated with the isolated engine audio sample and estimate the engine-related or vehicle-related information (e.g., estimated fuel level, estimated velocity, etc.) using the sound emission database 142 or based on the transmitted information (e.g., the raw audio sample).

The touchscreen of the input portion 126 of the mobile device 110 may receive user inputs in association with the application for sound emission analysis. For example, the application for sound emission analysis may prompt the user for a make or model of the motorcycle 150 being used or present a drop down list from which the user may select his or her corresponding motorcycle. This selection or user input indicative of the make or model of the motorcycle 150 may be utilized to determine or estimate the engine-related or vehicle-related information (e.g., estimated fuel level, estimated velocity, etc.) in connection with the sound emission database 142. Stated another way, the sound emission database 142 may include a field which is indicative of the make or the model of the motorcycle 150, the acoustic characteristic, and a corresponding fuel level given a measurement associated with the acoustic characteristic due to the differences in acoustic characteristics across different makes or models of vehicles or motorcycles. Explained yet again, because a first motorcycle may sound one way when full and a second motorcycle which is a different model may sound another way when full on fuel, the sound emission database 142 and corresponding application for sound emission analysis may be structured to account for these differences in sound or acoustic characteristics.

Thus, according to one aspect, the input portion 126 may receive the make or model associated with the motorcycle 150, the transmitter 122 may transmit the make or model associated with the motorcycle 150 to the remote server 140, and the receiver 124 may receive the estimated fuel level for the motorcycle 150 from the remote server 140 based on the transmitted make or model associated with the motorcycle 150.

According to another aspect, the motorcycle 150 may transmit sensor information to the mobile device 110, which may retransmit this sensor information to the remote server 140, which may use the sensor information to estimate the engine-related or vehicle-related information, to supplement the estimation calculations, to continue training the sound emission database 142 (e.g., by transmitting the sensor information or other information for verification), or to verify the results of the estimated engine-related or vehicle-related information. For example, the receiver 124 may receive the estimated fuel level for the motorcycle 150 from the remote server 140 based on the transmitted sensor information. The remote server 140 may update the sound emission database 142 based on the received sensor information, such as when the motorcycle 150 has a fuel gauge 162 as the sensor, for example. In other words, the microphone 118 may capture the audio sample and the transmitter 122 may transmit the raw or processed audio sample to the remote server 140 or the extracted acoustic characteristic to the remote server 140.

In any event, once the lookup is performed to determine the estimated fuel level or other estimated vehicle-related information, the sensor information from the motorcycle 150 may be used as a cross-reference or to verify the estimated fuel level or other estimated vehicle-related information. In this way, the processor 112, 154 or the remote server 140 may verify the estimated fuel level for the motorcycle 150 against the received sensor information from the motorcycle 150. According to another aspect, such as when the memory 114 of the mobile device 110 has a locally stored copy of the sound emission database 142 and when the motorcycle 150 includes the fuel gauge 162 as the sensor, the CAN bus 168 of the motorcycle 150 may provide the processor 112, 154 with the reading from the fuel gauge 162 indicative of the fuel level, and this may be compared against the estimated fuel level derived by the system 100 for sound emission analysis or the local sound emission database. The transmitter 122 of the mobile device 110 may transmit a discrepancy between the estimated fuel level for the motorcycle 150 and the received sensor information to the remote server 140. In this way, the remote server 140 may utilize the discrepancy to update its sound emission database 142 (e.g., which is a global sound emission database).

Although the above example was described with reference to the estimated fuel level as the estimated vehicle-related information, it will be appreciated that other estimated vehicle-related information may be contemplated, such as the velocity of the vehicle or revolutions per minute, etc.

According to one aspect, signal processing may be performed, by the processor 112 of the mobile device 110 or by the remote server 140, to account for noise within the audio sample, such as when the mobile device 110 is located in a pocket of the rider or within a backpack of the rider of the motorcycle 150.

Further, using the estimated fuel level, the mobile device 110 may transmit (via transmitter 122) the estimated fuel level (or the estimated vehicle-related information) to the motorcycle 150 (via receiver 186), which may display the estimated fuel level on the display 174. Additionally, warnings may be provided by the mobile device 110 and/or the motorcycle 150 based on the estimated vehicle-related information, such as low fuel level warnings, etc. In this way, the system and method for sound emission analysis enables the motorcycle 150 to be manufactured with cheaper or no fuel gauge sensors, thereby providing the advantage of reduced cost during manufacturing.

Figure 2:
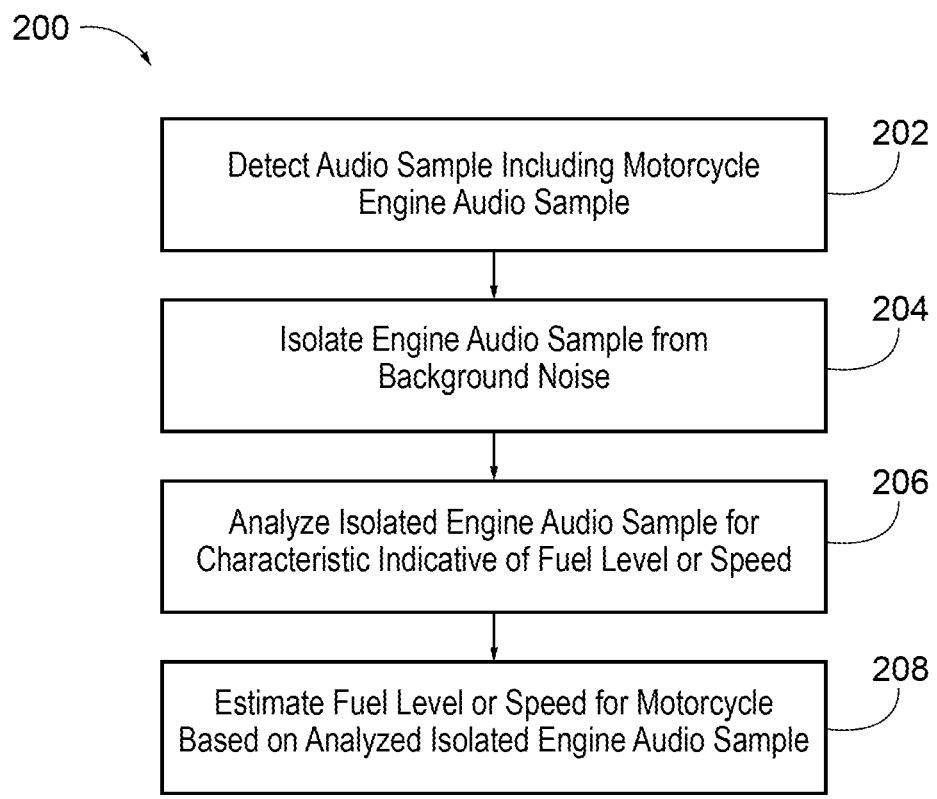
FIG. 2 is an exemplary flow diagram of a method for sound emission analysis, according to one aspect.

FIG. 2 is an exemplary flow diagram of a method 200 for sound emission analysis, according to one aspect. The method may include detecting 202 an audio sample including a motorcycle engine audio sample which is associated with acoustic information related to the motorcycle engine 172, isolating 204 an engine audio sample from background noise of the audio sample, analyzing 206 the isolated engine audio sample for a characteristic indicative of a fuel level or a speed of the motorcycle 150, and estimating 208 the fuel level or the speed for the motorcycle 150 based on the isolated engine audio sample or characteristics thereof. This may be achieved using a sound emission database 142 which includes a correlation of acoustic characteristics with estimated vehicle characteristics, such as the fuel level or the velocity.

Figure 3:
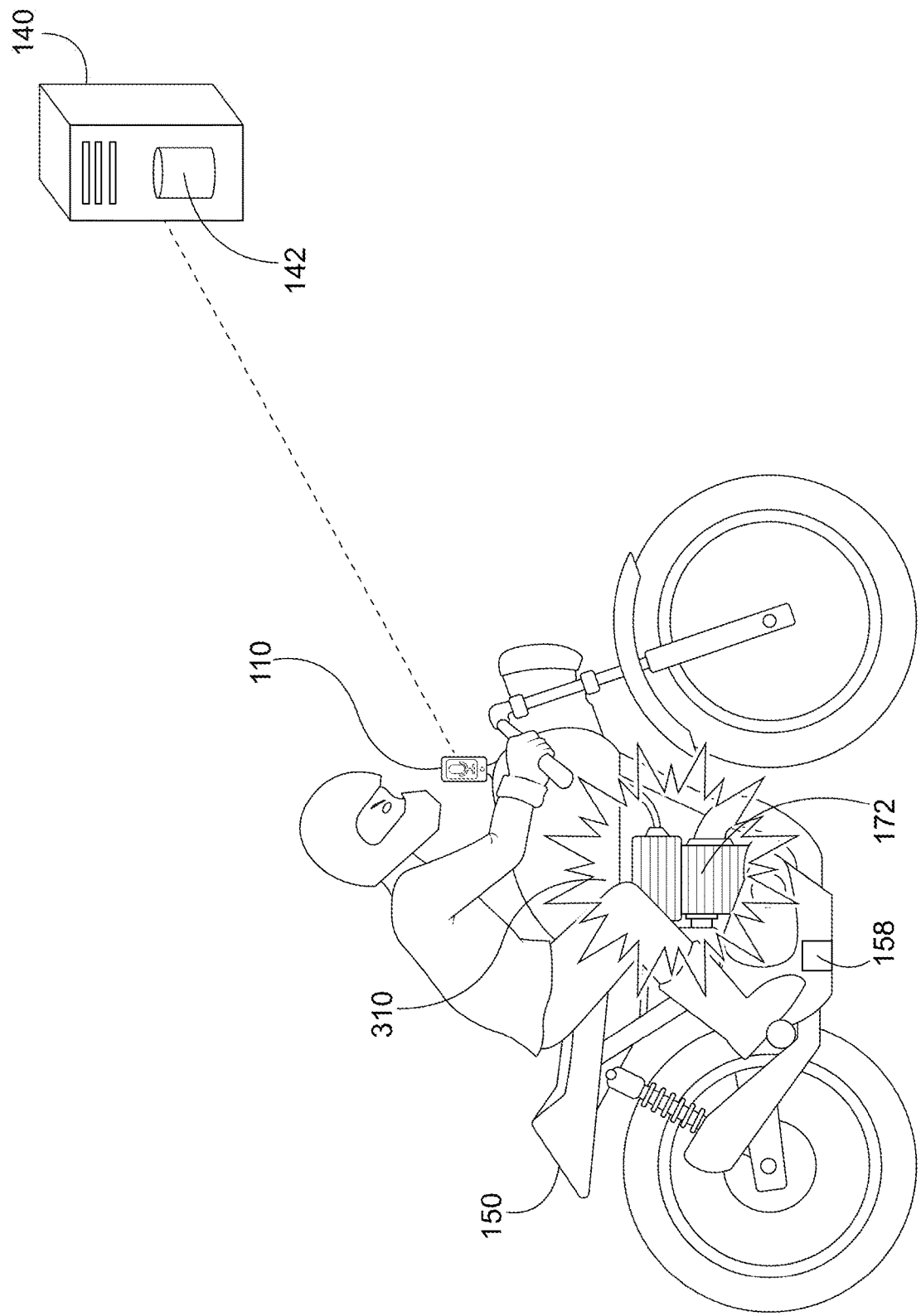
FIG. 3 is an exemplary scenario where the system for sound emission analysis of FIG. 1 may be implemented, according to one aspect.

FIG. 3 is an exemplary scenario where the system 100 for sound emission analysis of FIG. 1 may be implemented, according to one aspect. As seen in FIG. 3, an individual is riding the motorcycle 150, which includes the motorcycle engine 172, emitting the engine audio 310. This engine audio 310 may be captured as the engine audio sample by the microphone 118 of the mobile device 110. The mobile device 110, as previously discussed, may implement the entire system 100 for sound emission analysis or may pass off some of the processing (e.g., noise filtering, isolation of engine noise, identification of acoustic characteristics related to the motorcycle engine 172, etc.) to the remote server 140. According to one aspect, discrepancies between the sensors of the motorcycle 150 and the estimated vehicle characteristics may be used to retrain the sound emission database 142 of the remote server 140.

Figure 4:
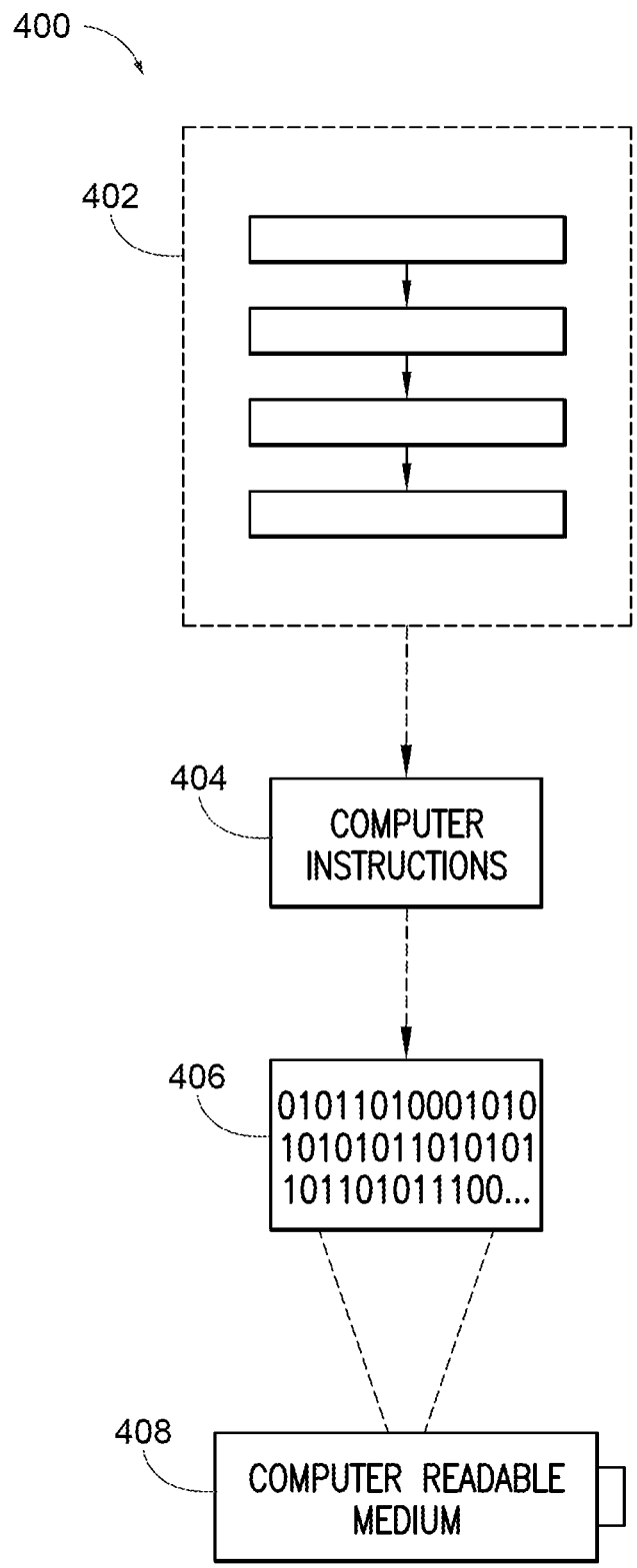
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 200 of FIG. 2. In another aspect, the processor-executable computer instructions 404 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
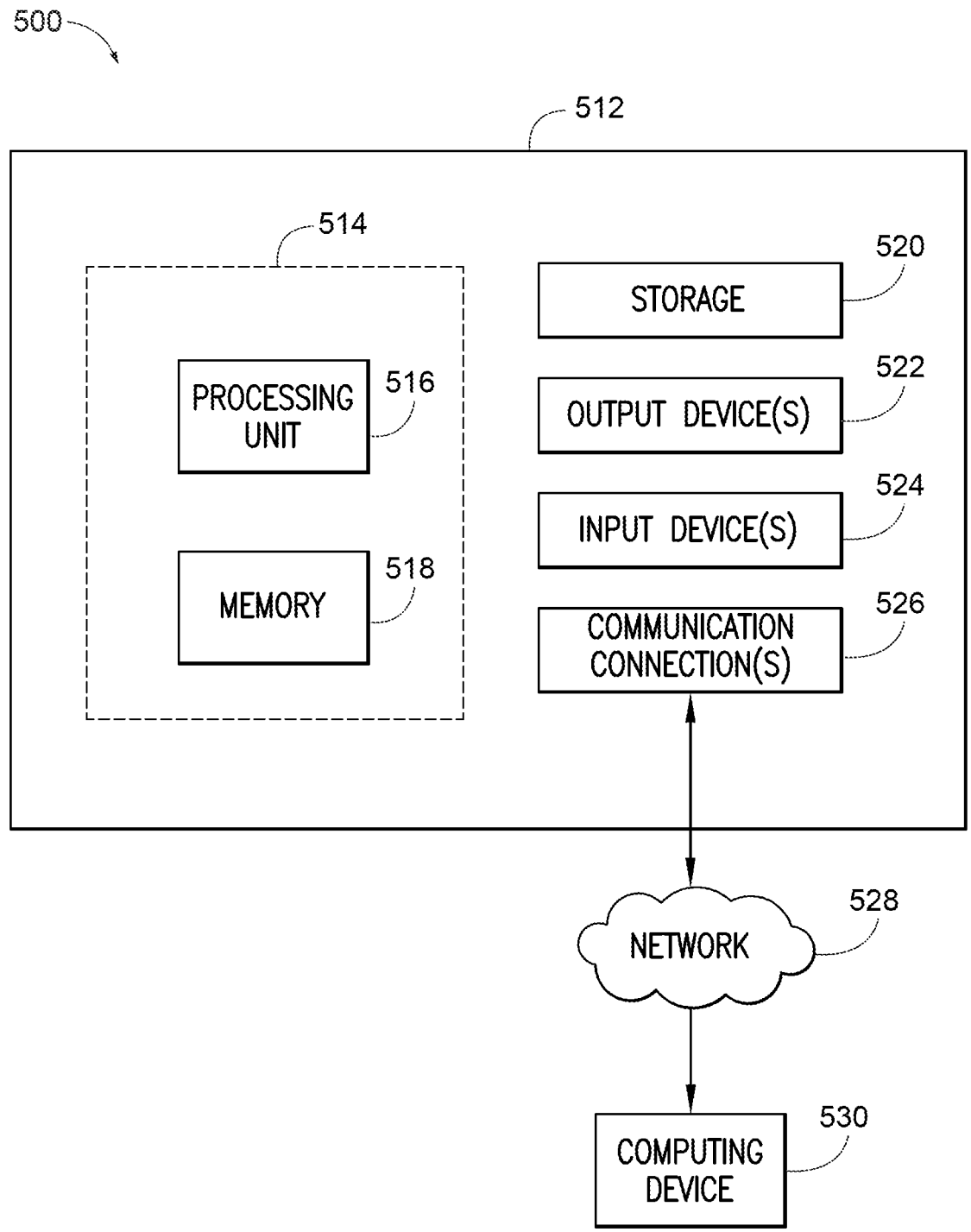
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the computing device 512 includes additional features or functionality. For example, the computing device 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which some or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for sound emission analysis, comprising:
a sensor detecting an audio sample, wherein the audio sample includes an engine audio sample associated with acoustic information of a motorcycle engine;
a processor; and
a memory storing instructions that, when executed by the processor, perform:
signal processing to isolate the engine audio sample from background noise associated with the audio sample;
analyzing the isolated engine audio sample for a characteristic indicative of a fuel level of the motorcycle; and
estimating the fuel level for the motorcycle based on the isolated engine audio sample.

2. The system for sound emission analysis of claim 1, wherein the memory includes instructions for the processor to perform:
receiving, from an input portion of the system for sound emission analysis, a make or model associated with the motorcycle; and
estimating the fuel level for the motorcycle based on the engine audio sample and the make or model associated with the motorcycle.

3. The system for sound emission analysis of claim 1, comprising a receiver receiving, from a remote server, a make or model associated with the motorcycle, wherein the memory includes instructions for the processor to perform estimating the fuel level for the motorcycle based on the engine audio sample and the make or model associated with the motorcycle.

4. The system for sound emission analysis of claim 1, comprising a receiver receiving sensor information from the motorcycle, wherein the memory includes instructions for the processor to perform estimating the fuel level for the motorcycle based on the engine audio sample and the sensor information received from the motorcycle.

5. The system for sound emission analysis of claim 1, comprising a receiver receiving sensor information from the motorcycle, wherein the memory includes instructions for the processor to perform verifying the fuel level for the motorcycle based on the sensor information received from the motorcycle.

6. The system for sound emission analysis of claim 1, comprising a transmitter transmitting the estimated fuel level for the motorcycle and isolated engine audio sample to a remote server.

7. The system for sound emission analysis of claim 6, comprising a receiver receiving a remotely calculated fuel level for the motorcycle in response to transmitting the estimated fuel level for the motorcycle and isolated engine audio sample to the remote server.

8. A system for sound emission analysis, comprising:
a sensor detecting an audio sample, wherein the audio sample includes an engine audio sample associated with acoustic information of a motorcycle engine;
a processor;
a memory storing instructions that, when executed by the processor, performs signal processing to isolate the engine audio sample from background noise associated with the audio sample;
a transmitter transmitting the isolated engine audio sample to a remote server; and
a receiver receiving an estimated fuel level for the motorcycle from the remote server based on the transmitted isolated engine audio sample.

9. The system for sound emission analysis of claim 8, comprising an input portion receiving a make or model associated with the motorcycle, wherein the transmitter transmits the make or model associated with the motorcycle to the remote server, and wherein the receiver receives the estimated fuel level for the motorcycle from the remote server based on the transmitted make or model associated with the motorcycle.

10. The system for sound emission analysis of claim 8, wherein the receiver receives sensor information from the motorcycle, wherein the transmitter transmits the sensor information to the remote server, and wherein the receiver receives the estimated fuel level for the motorcycle from the remote server based on the transmitted sensor information.

11. The system for sound emission analysis of claim 8, wherein the receiver receives sensor information from the motorcycle, wherein the processor verifies the estimated fuel level for the motorcycle against the received sensor information from the motorcycle.

12. The system for sound emission analysis of claim 11, wherein the transmitter transmits a discrepancy between the estimated fuel level for the motorcycle and the received sensor information to the remote server.

13. The system for sound emission analysis of claim 12, wherein the discrepancy is utilized by the remote server to update a sound emission database.

14. The system for sound emission analysis of claim 8, comprising a display displaying the estimated fuel level for the motorcycle.

15. A system for sound emission analysis, comprising:
a sensor detecting an audio sample, wherein the audio sample includes an engine audio sample associated with acoustic information of a motorcycle engine;
a processor; and
a memory storing instructions that, when executed by the processor, perform:
signal processing to isolate the engine audio sample from background noise associated with the audio sample;
analyzing the isolated engine audio sample fora characteristic indicative of a speed of the motorcycle;
estimating the speed of the motorcycle based on the isolated engine audio sample; and
a transmitter transmitting the estimated speed of the motorcycle and isolated engine audio sample to a remote server.

16. The system for sound emission analysis of claim 15, wherein the memory includes instructions for the processor to perform:
receiving, from an input portion of the system for sound emission analysis, a make or model associated with the motorcycle; and
estimating the speed for the motorcycle based on the engine audio sample and the make or model associated with the motorcycle.

17. The system for sound emission analysis of claim 15, comprising a receiver receiving, from a remote server, a make or model associated with the motorcycle, wherein the memory includes instructions for the processor to perform estimating the speed of the motorcycle based on the engine audio sample and the make or model associated with the motorcycle.

18. The system for sound emission analysis of claim 15, comprising a receiver receiving sensor information from the motorcycle, wherein the memory includes instructions for the processor to perform estimating the speed of the motorcycle based on the engine audio sample and the sensor information received from the motorcycle.

19. The system for sound emission analysis of claim 15, comprising a receiver receiving sensor information from the motorcycle, wherein the memory includes instructions for the processor to perform verifying the speed of the motorcycle based on the sensor information received from the motorcycle.

* * * * *